William B. Scaife's
Improvement in Kitchen-Boiler

REISSUED JUL. 11 1871

4467

Witnesses
A. C. Johnston
James L. Johnston

Inventor
W. B. Scaife

UNITED STATES PATENT OFFICE.

WILLIAM B. SCAIFE, OF PITTSBURG, PENNSYLVANIA.

IMPROVEMENT IN BOILERS FOR RANGES, STOVES, &c.

Specification forming part of Letters Patent No. 107,817, dated September 27, 1870; reissue No. 4,467, dated July 11, 1871.

*To all whom it may concern:*

Be it known that I, WILLIAM B. SCAIFE, of Pittsburg, in the county of Allegheny and State of Pennsylvania, have invented a new and useful article of manufacture, viz., an Iron Boiler for Kitchen-Ranges, Stoves, &c.; and I do hereby declare that the following is a full, clear, and exact description thereof, reference being had to the accompanying drawing and to the letters of reference marked thereon.

The nature of my invention consists in a new article of manufacture, viz., a wrought-iron boiler for kitchen-ranges, stoves, &c., one or both ends of said boiler being a section of a sphere provided with a flange, the outer surface of which is parallel to the vertical axis of the spherical portion of the end, said flange being fitted in and secured by rivets to the cylindrical portion of the boiler, and the joints afterward made water and steam-tight by "solder-soaking" and calking.

To enable others skilled in the art to make and use my new article of manufacture, I will proceed to describe more fully its construction.

Figure 1:
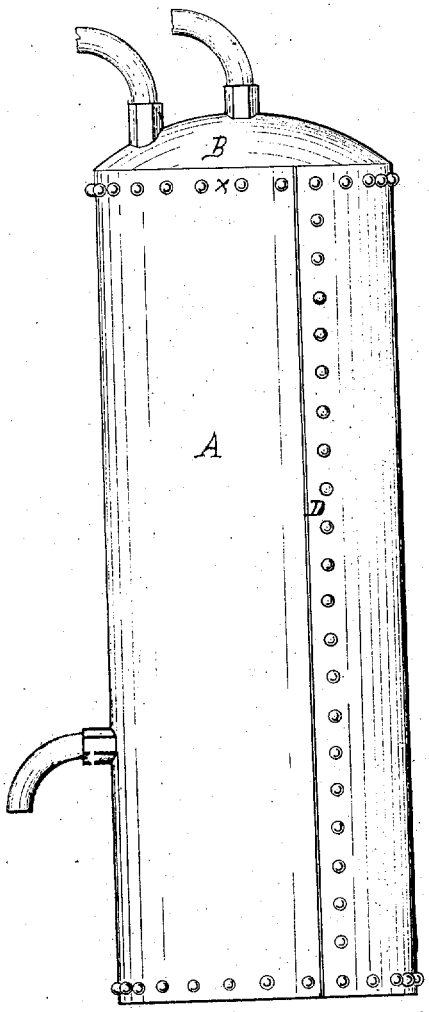
Figure 2:
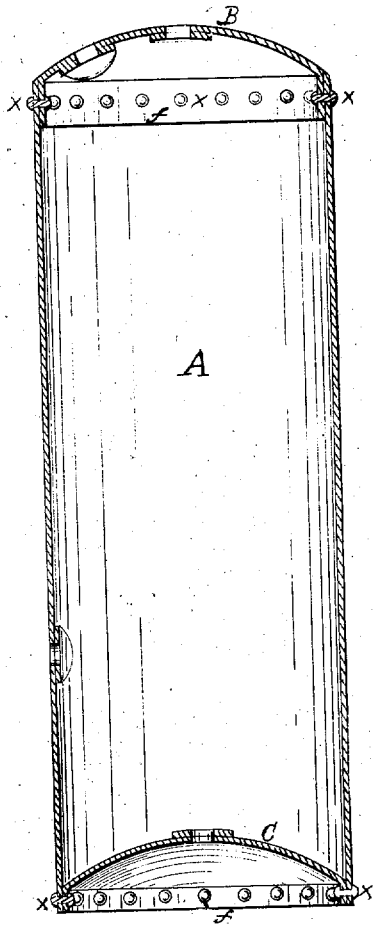

In the accompanying drawing which forms part of my specification, Figure 1 is a side elevation of my improvement in iron boilers for kitchen-ranges, stoves, &c. Fig. 2 is a vertical section of the same.

A represents the body of the boiler, which is made cylindrical in form, and constructed of wrought-iron. The joint D is secured by rivets and then brazed. The top or upper end B is constructed of iron, and forms a section of a sphere provided with a flange, *f*, and is secured in the body A by rivets, as shown at *x*. The lower end or bottom C may be made of the same form as the top or upper end B, and secured in body A in the manner shown in Fig. 2. The joints around ends or top B and bottom C are calked or otherwise made water and steam-tight. The body A and the top B and bottom C are provided with openings for the pipes used in connection with the boiler for producing the necessary circulation of water through it and the heating device used in combination with the boiler for heating water for the kitchen, bath-room, or for other purpose, which arrangement of pipes is well understood by the skillful plumber and gas-fitter.

The novelty of my new article of manufacture consists in constructing the top end B in the form shown in the accompanying drawing. A further novelty in my new article of manufacture consists in making the bottom C in the form of a section of a sphere, as shown in Fig. 2. The advantage of this construction of the top B and bottom C consists in diminishing the weight, greatly increasing the strength and durability of the boiler without any additional cost.

The top and bottom of the ordinary kitchen-boiler are made flat and constructed of cast-iron. Such form and material for tops and bottoms are very objectionable, for the difference between the expansion and contraction of the wrought-iron of the body or shell and the cast-iron top and bottom renders it almost impossible to construct the joints around the top and bottom so as to make them water and steam-tight. The frequent and varying pressure to which range and stove-boilers are subjected causes the flat ends to buckle or vibrate so as to render the boiler inoperative and worthless, and very often flooding the kitchen, bath-room, or other apartment of the house with water, which is a very annoying and distressing thing to the good housewife.

From the foregoing the advantages of my new article of manufacture will be very apparent to the manufacturer, plumber, and gas-fitter, and also to the user of range and stove-boilers.

The dome-shaped top, in addition to its strength and durability, adds greatly to the symmetrical appearance of the boiler, making it handsome, useful, and durable.

I wish it clearly understood that I do not claim, broadly, a water-heating apparatus with one or several of its parts provided with spherical end or ends, such device being shown in the patent granted to G. L. Ingersoll, November 26, 1867, also in the patent of William Bebee, November 14, 1854.

Having thus described my new article of manufacture, what I claim as new is—

A new article of manufacture, viz., a wrought-iron boiler for kitchen-ranges, stoves, &c., one or both ends of said boiler being a section of a sphere provided with a flange, the outer surface of which is parallel to the vertical axis of the spherical portion of the end, said flange being fitted in and secured by rivets to the cylindrical portion of the boiler, and afterward made water and steam-tight, as hereinbefore described, and for the purpose set forth.

Witnesses: W. B. SCAIFE.

A. C. JOHNSTON,

JAMES J. JOHNSTON.